US006925211B2

(12) United States Patent
Burns et al.

(10) Patent No.: US 6,925,211 B2
(45) Date of Patent: Aug. 2, 2005

(54) BUFFER LAYER STRUCTURES FOR STABILIZATION OF A LITHIUM NIOBATE DEVICE

(76) Inventors: William K. Burns, 1212 Priscilla La., Alexandria, VA (US) 22308; Larry A. Hess, 19708 Selby Ave., Poolesville, MD (US) 20837; Vishal Agarwal, 559 Manet Ter., Sunnyvale, CA (US) 94087

( * ) Notice: Subject to any disclaimer, the term of this patent is extended or adjusted under 35 U.S.C. 154(b) by 140 days.

(21) Appl. No.: 10/602,833

(22) Filed: Jun. 25, 2003

(65) Prior Publication Data

US 2005/0047720 A1 Mar. 3, 2005

Related U.S. Application Data

(60) Division of application No. 10/143,885, filed on May 14, 2002, now Pat. No. 6,661,934, which is a continuation-in-part of application No. 10/035,193, filed on Jan. 4, 2002, now Pat. No. 6,654,512.

(51) Int. Cl.[7] .............................................. G02F 1/035
(52) U.S. Cl. ........................................................ 385/2
(58) Field of Search ............................... 385/2, 3

(56) References Cited

U.S. PATENT DOCUMENTS

| | | | | |
|---|---|---|---|---|
| 4,701,008 A | | 10/1987 | Richard et al. | 350/96.12 |
| 5,153,930 A | * | 10/1992 | DuPuy et al. | 385/8 |
| 5,388,170 A | | 2/1995 | Heismann et al. | 385/4 |
| 5,404,412 A | | 4/1995 | Seino et al. | 385/2 |
| 5,479,552 A | * | 12/1995 | Kitamura et al. | 385/132 |
| 5,617,493 A | * | 4/1997 | Nishimoto | 385/40 |
| 5,675,691 A | * | 10/1997 | Edlinger et al. | 385/130 |
| 5,949,944 A | | 9/1999 | Minford et al. | 385/131 |
| 6,395,650 B1 | * | 5/2002 | Callegari et al. | 438/785 |
| 6,583,917 B2 | * | 6/2003 | Melloni et al. | 359/245 |

FOREIGN PATENT DOCUMENTS

| | | |
|---|---|---|
| EP | 0 554 593 A1 | 8/1993 |
| EP | 0 717 306 A1 | 6/1996 |

OTHER PUBLICATIONS

Wei–Ching Chung et al., A Comparison of the Performance of $LiNbO_3$ Traveling–wave Phase Modulators with Various Dielectric Buffer Layers, Journal of Optical Communications 14(1993) Aug., No. 4, Berlin, DE.
C.H. Bulmer et al., "Pyroelectric Effects in LiNbO3 Channel–Waveguide Devices," *Applied Physics Letters,* vol. 48, No. 16, (Apr.) 1986, pp. 1036–1038.
I. Sawasaki et al., "Thermally Stabilized Z–cut Ti:LiNbO3 Waveguide Switch," *Conference on Lasers and Electro–optics,* paper MF2, San Francisco, (Jun.) 1986, pp. 46–47.
Perry Skeath et al., "Novel Electrostatic Mechanism in the Thermal Instability of Z–cut $LiNbO_3$ Interferometers," *Applied Physics Letters,* vol. 49, No. 19, (Nov.) 1986, pp. 1221–1223.
G.K. Gopalakrishnan et al., "Performance and Modeling of Broadband $LiNbO_3$ Traveling Wave Optical Intensity Modulators," *Journal of Lightwave Technology,* vol. 12, No. 10, (Oct.) 1994, pp. 1807–1819.

* cited by examiner

*Primary Examiner*—Edward J. Glick
*Assistant Examiner*—Thomas R Artman
(74) *Attorney, Agent, or Firm*—Morgan Lewis & Bockius LLP

(57) ABSTRACT

An optical waveguide device including an electro-optical crystal substrate having a top surface and a bottom surface; an optical waveguide path formed within a surface of the electro-optical crystal substrate; at least one electrode positioned above the optical waveguide path for applying an electric field to the optical waveguide path; and a silicon titanium oxynitride layer and a connecting layer for interconnecting the silicon titanium oxynitride layer to another surface of the electro-optical crystal substrate that is opposite to the surface in which the optical waveguide path is formed.

5 Claims, 8 Drawing Sheets

BUFFER LAYER STRUCTURES FOR STABILIZATION OF A LITHIUM NIOBATE DEVICE

This is a divisional application of pending prior application No. 10/143,885, filed on May 14, 2002, now U.S. Pat. No. 6,661,934, which is a Continuation-in-Part of prior application No. 10/035,193, filed on Jan. 4, 2002, now U.S. Pat. No. 6,654,512.

BACKGROUND OF THE INVENTION

1. Field of the Invention

The present invention relates to an optical waveguide modulator, and more particularly, to the provision of improved thermal and temporal bias stability in optical waveguide devices.

2. Discussion of the Related Art

Mach Zehnder interferometers (MZI's) used as optical modulators are of great interest for high data rate fiber optical communications systems. A great deal of research has been carried out to develop this type of device since its introduction in the mid-70's. The practicality of Ti-diffused LiNbO$_3$ waveguide systems has allowed wide introduction of these devices in current optical communication systems.

FIG. 1 illustrates a plan view of a related art Z-cut lithium niobate Mach-Zehnder interferometer used for modulation of an optical signal. An optical waveguide path 4 is formed inside a surface of a lithium niobate (LiNbO$_3$) substrate 1 that splits into a first path 4a and a second path 4b and then recombines back into a single path 4'. The optical waveguide paths 4a and 4b may be formed by diffusion of a metal, for example titanium, or with other dopants that will form an optical path in the lithium niobate substrate 1. An electric field is applied to the first optical waveguide path 4a and the second optical waveguide path 4b via electrodes 2a and 3, respectively, that are positioned over the first and second optical waveguide paths. Specifically, the electrode 2a over the first optical waveguide path 4a is a ground electrode and the electrode 3 over the second optical waveguide path 4b is an input electrode. In addition, another ground electrode 2b is positioned on the substrate so that ground electrodes 2a and 2b are on each side of the input electrode 3 for further control of the electric fields applied to the first and second optical waveguide paths 4a and 4b. The electrodes 2a, 2b and 3 are separated from the substrate 1 by a buffer layer 5. The application of the electric field changes the refractive index of an optical waveguide path in proportion to the amount of electric field applied. By controlling the amount of electric field applied via the electrodes 2a, 2b and 3, an optical signal passing through the optical waveguide paths can be modulated.

FIG. 2 is cross-sectional view of the related art Z-cut lithium niobate Mach-Zehnder interferometer along line B-B' in FIG. 1. The buffer layer 5 is comprised of a transparent dielectric film and is positioned between the electro-optical crystal substrate 1 and the electrodes 2a, 2b and 3. The buffer layer 5 prevents optical absorption of the optical mode by the metal electrodes 2a and 3. However, the buffer layer 5 allows electric fields that emanate from the electrode 3 to affect a refractive index change in either or both the first optical waveguide path 4a or the second optical waveguide path 4b. Typically, silicon dioxide (SiO$_2$) is used as the buffer layer due to its optical transparency at 1.55 microns and its low dielectric constant.

FIG. 2 also illustrates that electro-optical crystal substrate 1 of the related art Z-cut lithium niobate Mach-Zehnder interferometer is formed so that a Y axis of the crystal orientation extends in a longitudinal direction of the lithium niobate substrate 1 along the waveguide paths 4a and 4b. The Z axis of the crystal orientation extends in the direction of the thickness of the electro-optical crystal substrate 1 such that the top and bottom surfaces of the lithium niobate substrate 1 are respectively −Z and +Z faces in terms of the crystal lattice structure of the substrate. The optical waveguide paths are commonly denoted as being within the −Z face of the lithium niobate substrate.

One of the practical difficulties in the early introduction of Z-cut LiNbO$_3$ devices was the pyroelectric sensitivity of LiNbO$_3$, which resulted in the development of large internal fields within the devices when subjected to temperature changes or gradients across the device. This is because a change in temperature causes a change in the spontaneous polarization due to the ferroelectric properties of LiNbO$_3$. As illustrated in FIG. 2, this results in an imbalance of charge between the Z faces of the electro-optical crystal substrate 1, so that an electric field is generated in the Z direction perpendicularly along the waveguide paths 4a and 4b of the device. Due to the very high resistivity of LiNbO$_3$, these charges take a long time to travel through the electro-optical crystal substrate 1 and neutralize themselves. This imbalance of charge impedes or lessens the effect of the electrical fields from the electrodes 2a, 2b and 3 on the waveguide paths 4a or 4b, thus decreasing the effectiveness or control in modulating optical signals. Early modulators were highly susceptible to thermal changes and strict environmental controls were necessary for thermal stabilization of the devices.

An early approach to maintain or prevent loss of modulation control due to thermal effects was to bleed off or counteract the imbalance of charge between the Z faces of a LiNbO$_3$ substrate. C. H. Bulmer et al. (one of the authors is an inventor in this application), "Pyroelectric Effects in LiNbO$_3$ Channel Waveguide Devices," Applied Physics Letters 48, p. 1036, 1986 disclosed that metallizing the Z faces, and electrically connecting them with a high conductivity path to allow the unbalanced charge to neutralize rapidly, resulted in improved thermal stability of an X-cut device. Nonetheless, in Z-cut devices, this approach is difficult since the waveguide paths are on the Z face, and a metalized layer on this face would short out the electrodes of the device, making the device ineffective or inoperable.

Instead of a metallization layer, P. Skeath et al. (one of the authors is an inventor in this application), "Novel Electrostatic Mechanism in the Thermal Stability of Z-Cut LiNbO$_3$ Interferometers," Applied Physics Letters 49, p 1221, 1986 and I. Sawaki et al., Conference on Lasers and Electro-Optics, MF2, PP. 46–47, San Francisco, 1986 suggested a semiconducting or semi-insulating layer on the Z face under the electrodes of a Z-cut device. The semiconducting or semi-insulating layer would transfer the unbalanced charge between the Z faces of the LiNbO$_3$ substrate but not short out the electrodes. Although X-cut devices are commonly treated by providing metal layers or other conductive layers on the Z faces and interconnecting the conductive layers, research continues as to what semiconductor or semi-insulating layer can be best or appropriately specified for use with Z-cut devices.

Approaches attempted in the past have included Indium Tin Oxide (ITO), Silicon (Si), and Silicon Titanium Nitride (Si$_x$Ti$_y$N$_z$) layers, which are applied in place of or above the usual SiO$_2$ buffer layer on a Z-cut optical waveguide device. Minford et al., "Apparatus and Method for Dissipating Charge from Lithium Niobate Devices, U.S. Pat. No. 5,949, 944, Sep. 7, 1999, which is hereby incorporated by reference, proposes a silicon titanium nitride layer that has the advantage of adjustable resistivity by adjustment of the silicon/titanium ratio. However, control of the resistivity is unsatisfactory due to oxygen contamination in the silicon titanium nitride buffer layer, which results from residual background gases in the deposition system. This results in unacceptable run-to-run variation in the resistivity of a silicon titanium nitride buffer layer. Furthermore, the deposition system for a silicon titanium nitride buffer layer includes a sputtering process that requires a variety of targets with varying compositions to vary the composition of the buffer layer over a desired range and thus, is not a practical process with suitable control of the resistivity.

The effect of the electric field and the consistency of the effect of the electric field over time (i.e. temporal stability) applied to the waveguide paths are greatly affected by characteristics of the buffer layer. The amount of electric field from the electrodes that is affected by charge variations within the buffer layer or by the charge imbalance in the lithium niobate substrate is referred to as the bias drift of a device. Temporal stability of Z-cut Ti diffused $LiNbO_3$ devices has been discussed in Seino et al., "Optical Waveguide Device," U.S. Pat. No. 5,404,412, Apr. 4, 1995, which is hereby incorporated by reference. Specifically, Seino et al. shows that repeated or constantly applied voltages across a buffer layer in a Z-cut device will ultimately result in a buffer layer developing charge screening processes that significantly reduces the electric field across the waveguide paths. Seino et al. further shows that by adding titanium and indium oxides to an $SiO_2$ buffer layer, the resulting bias drift was reduced (delayed in time).

SUMMARY OF THE INVENTION

Accordingly, the present invention is directed to $LiNbO_3$ devices that substantially obviates one or more of the problems due to limitations and disadvantages of the related art.

One aspect of the invention relates to pyroelectric or thermal stabilization of $LiNbO_3$ electro-optical devices.

Another aspect of the invention relates to temporal stabilization of $LiNbO_3$ electro-optical devices.

Also, another aspect of the invention relates to a process enabling control of resistivity in a buffer layer structure for electro-optical devices.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

The preferred embodiments of the present invention relate to a silicon titanium oxynitride buffer layer structure formed by $O_2$ being deliberately introduced during a sputtering deposition process with a silicon nitride titanium nitride target in a nitrogen and a non-reactive gas environment. The $O_2$ concentration during the deposition of the silicon titanium oxynitride is a tuning parameter for adjusting the resistivity of a resulting buffer layer. In the alternative or in addition to adjusting the $O_2$ concentration, the $N_2$ concentration may be varied during deposition as another tuning parameter for adjusting the resistivity of the resulting buffer layer. Due to the ease in controlling the process, buffer layers over a broad range of resistivities can be produced from a single fixed ratio silicon nitride-titanium nitride target. Furthermore, a buffer layer having a resistivity gradient can be produced by controlling the amount of $O_2$ and/or $N_2$ during the deposition of the buffer layer.

In accordance with the present invention, a variety of exemplary silicon titanium oxynitride films were fabricated by sputtering from a 50% $Si_3N_4$–50% TiN target in an atmosphere containing a non-reactive sputtering gas (i.e., Ar), a predetermined amount of $N_2$, and a predetermined amount of $O_2$. Using the 50% $Si_3N_4$/50% TiN target and two chamber pressures of 1 and 5 m torr, gas flows of 40 sccm (standard cubic cm) Ar and 20 sccm $N_2$ were introduced into the reaction chamber for each film. The resistivity of each film was controlled by a flow rate of a 95% Ar/5% $O_2$ mixture that was between and 0.5–10 sccm for each film. Although exemplary conditions have been set forth above, the mixture of gases and flow rates may be varied or otherwise different for $Si_3N_4$/TiN targets having different percentages of compositions.

Figure 3:
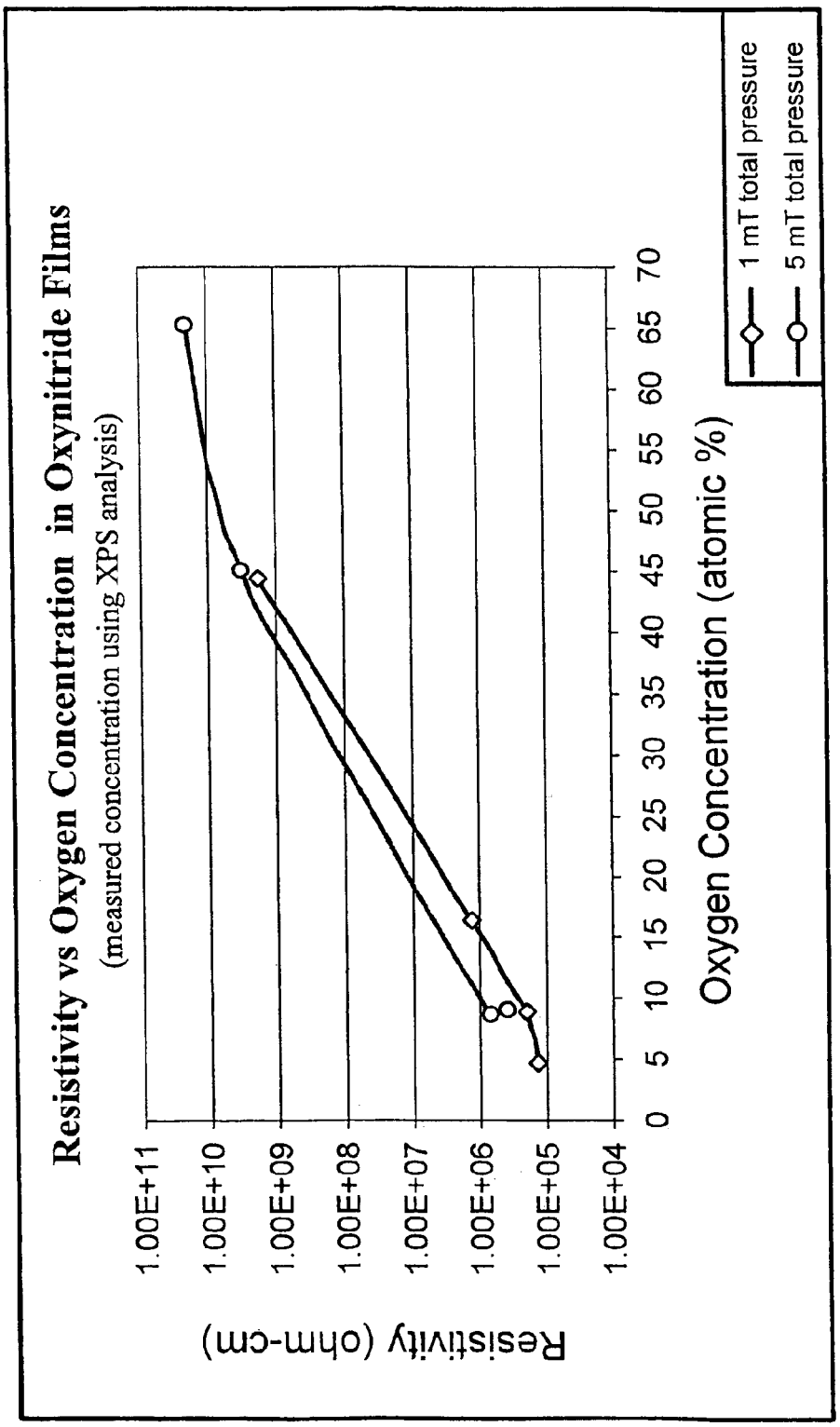
FIG. 3 is a chart of the resistivity vs. oxygen concentration for an exemplary buffer layer of the present invention.

After deposition of the films, the resistivities were measured and the film oxygen content, in atomic percent, was measured using XPS analysis. The results are shown in the chart of FIG. 3, where resistivity vs. oxygen concentration is plotted. The film resistivities varied from approximately $10^5$ to $10^{10}$ Ohm-cm while oxygen concentrations in the films varied from approximately 5% to 65% (atomic %). The resistivities of the films were stable over periods of months, and were also stable when subjected to 125 degrees C heat treatment in air overnight. Since $O_2$ and $N_2$ gas flow in the chamber was precisely controlled, and the $O_2$ chamber concentration was large compared to any residual background gases, run-to-run reproducibility of the resistivity was good.

In continued accordance with the present invention, the use of other percentage compositions for $Si_3N_4$ and TiN as the $Si_3N_4$-TiN target will further extend the range of resistivities that can be achieved by the process above. For example, a higher percentage of TiN (i.e., 40T $Si_3N_4$/60% TiN) in the target will allow for a range of lower resistivities that can be accurately obtained redundantly and a higher percentage of $Si_3N_4$ (i.e., 60% $Si_3N_4$/40% TiN) will allow for a range of higher resistivities that can be accurately obtained redundantly. For a predetermined fixed percentage composition $Si_3N_4$-TiN target, a predetermined resistivity, within the range of resistivities for that fixed percentage ratio target, can be accurately obtained redundantly by control of the $O_2$ concentration or $N_2/O_2$ ratio in the sputtering gas.

Figure 4:
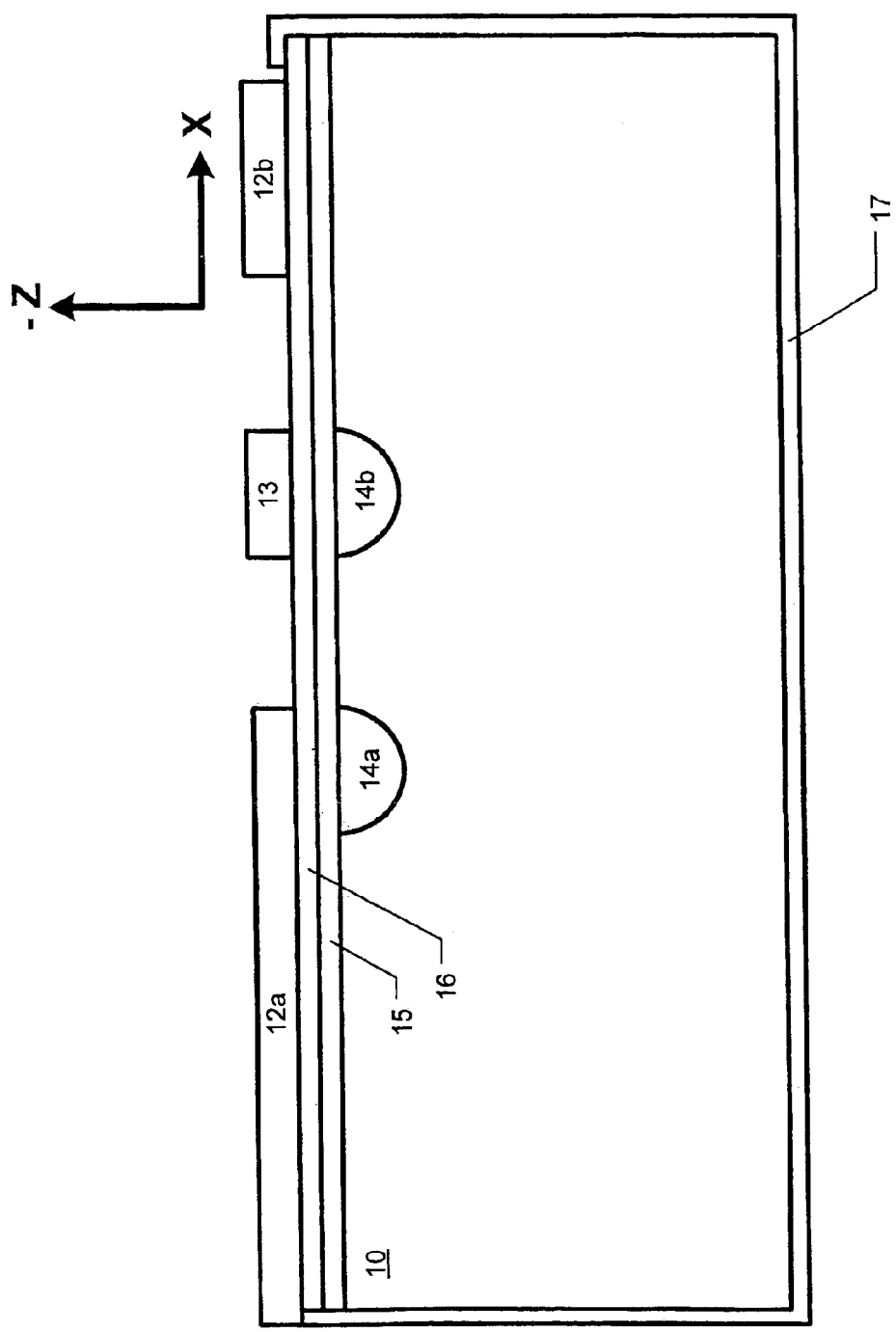
FIG. 4 is a cross-sectional view of a Z-cut lithium niobate waveguide device according to a first exemplary embodiment of the present invention.

FIG. 4 is a cross-sectional view of a first exemplary embodiment of the present invention having a silicon titanium oxynitride film as a buffer layer for suppressing thermal (i.e., pyroelectric) effects in a broadband traveling wave Mach-Zehnder interferometer. The Mach-Zehnder interferometer includes a Z-cut lithium niobate substrate 10 in which optical waveguide paths 14a and 14b are formed by diffusion of a dopant, for example titanium, to form the optical waveguide paths. Electrodes 12a and 13 are respectively positioned above (i.e. vertically separated from) or directly above (i.e. vertically separated from and overlapping) the first optical waveguide path 14a and the second optical waveguide path 14b. Specifically, the electrode 12a over the first optical waveguide path 14a is a ground electrode and the electrode 13 over the second optical waveguide path 14b is an input electrode. In addition, another ground electrode 12b is positioned on the substrate so that ground electrodes 12a and 12b are on each side of the input electrode 13 for further control of the electric fields applied to the first and second optical waveguide paths 14a and 14b. An undoped $SiO_2$ buffer layer 15 is formed on the surface of the Z-cut lithium niobate substrate 10 above the optical waveguide paths 14a and 14b. A silicon titanium oxynitride buffer layer 16 is positioned between the undoped $SiO_2$ buffer layer 15 and the electrodes 12a, 12b and 13, and above the optical waveguide paths 14a and 14b in the Z-cut lithium niobate substrate 10. The thickness of the silicon titanium oxynitride buffer layer 16 is about 0.1–1.0 micron and the thickness of the $SiO_2$ buffer layer 15 is about 0.1–1.5 micron. The undoped $SiO_2$ buffer 15 layer isolates the optical fields within the waveguide paths 14a and 14b from the metal electrodes with a low dielectric constant but yet has an optical transparency for an optical wavelength of 1.55 microns.

A connecting layer 17 interconnects the silicon titanium oxynitride buffer layer 16 above the −Z face (top surface) and the +Z face (bottom surface) of the lithium niobate substrate 10 on the sides (as shown in FIG. 4) or on one side of the lithium niobate substrate 10. A carbon or silver paint, solder paste, conductive epoxy or other conductive materials can be used as the connecting layer 17. Furthermore, resistive materials such as semiconductors or ceramics may be used as the connecting layer 17. In the alternative, the silicon titanium oxynitride buffer layer 16 and the +Z face (bottom surface) of the lithium niobate substrate 10 can both be commonly connected to the housing (not shown) of the device. Although the connecting layer 17 is shown in FIG. 4 as overlapping the top surface of the silicon titanium oxynitride 10, alternatively, the connecting layer 17 can just contact a side surface of silicon titanium oxynitride buffer layer 16.

Figure 5:
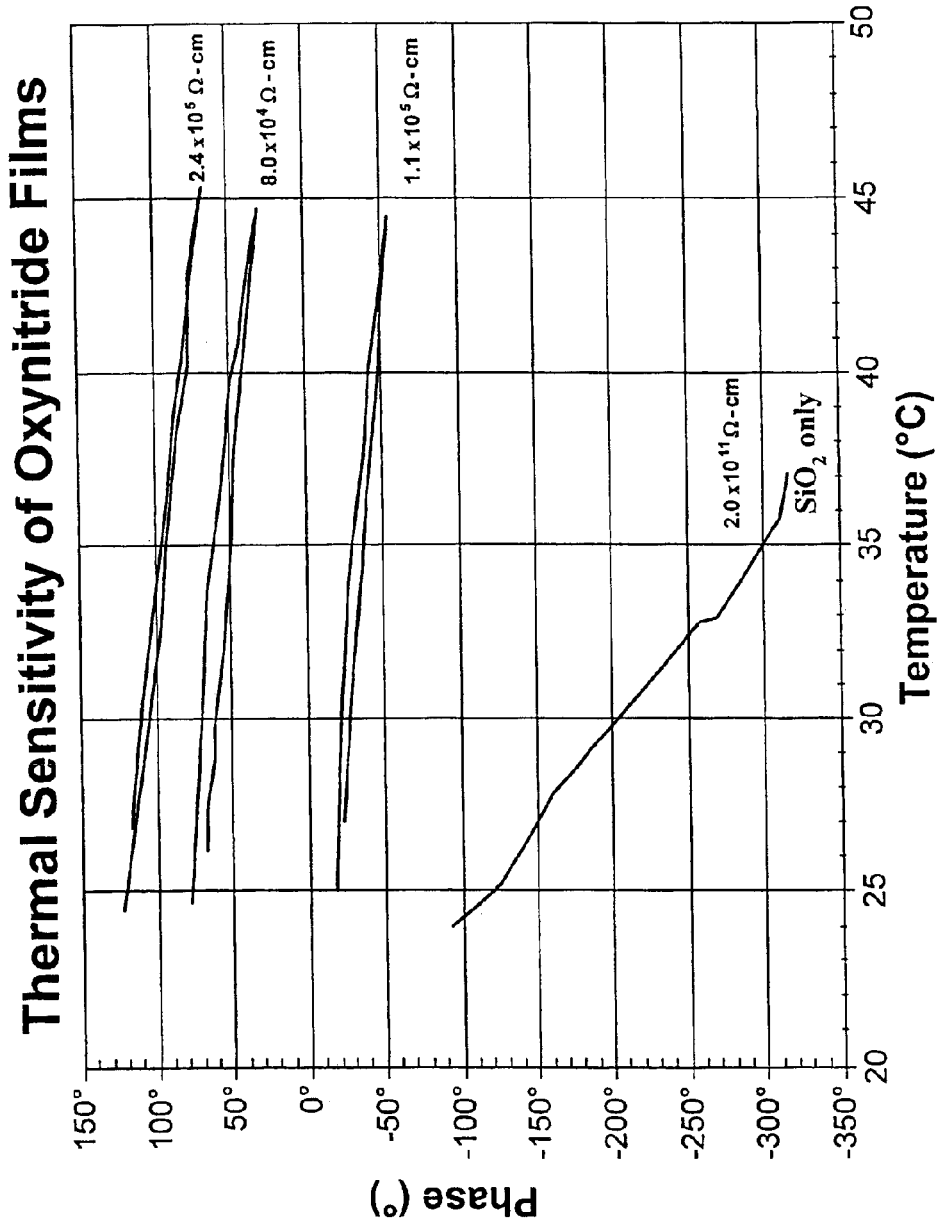
FIG. 5 is a chart of the thermal sensitivity for a Z-cut lithium niobate waveguide device according to the first exemplary embodiment of the present invention.

Three devices of the first exemplary embodiment, as described above, were manufactured having different silicon titanium oxynitride buffer layer resistivities that varied from approximately $8.0 \times 10^4$–$2.5 \times 10^5$ Ohm-cm. The resistivity of the $SiO_2$ buffer layer 15 under the silicon titanium oxynitride buffer layer 16 was approximately $2 \times 10^{11}$ Ohm-cm. The three devices were heated on a hot plate and the intrinsic interferometer phase change was monitored as the temperature of the device was increased from 25 to 45 degrees C and then decreased from 45 to 25 degrees C. The intrinsic phase of an interferometer will change as the temperature changes due to thermal (i.e., pyroelectric) effects within the lithium niobate substrate 10. The intrinsic phase of the interferometers due to thermal effects for the three devices with a silicon titanium oxynitride buffer layer and for a control device with just a $SiO_2$ buffer layer are shown in FIG. 5. The resistivity of the $SiO_2$ buffer layer on the control sample was approximately $2 \times 10^{11}$ Ohm-cm. Specifically, FIG. 5 shows the changes in intrinsic phase of the interferometers as the temperature is increased (from left to right) and then as the temperature is decreased (from right to left). The three devices with a silicon titanium oxynitride buffer layer show thermal sensitivities (change in interferometer phase/change in temperature) of approximately 2–2.5 degrees/degree C, nearly an order of magnitude smaller than the control sample without the silicon titanium oxynitride buffer layer. Therefore, the chart in FIG. 5 demonstrates that a silicon titanium oxynitride buffer layer achieves thermal stabilization and mitigates pyroelectric effects. In addition, the three devices did not exhibit any other performance degradation due to the presence of the silicon titanium oxynitride buffer layer.

A silicon titanium oxynitride buffer layer is useful for temporal as well as thermal stabilization of Z-cut $LiNbO_3$ devices. As discussed above with regard to FIG. 4, the $SiO_2$ buffer layer on a lithium niobate substrate isolates the optical field of the waveguide paths from the metal electrodes. Furthermore, $SiO_2$ has a refractive index of approximately 1.45 that is significantly less than the lithium niobate and thus prevents that optical signal from being absorbed by the electrodes. However, a silicon titanium oxynitride layer with an appropriate compositional structure can replace a $SiO_2$ buffer layer. Therefore, a buffer layer structure can be formed in a single layer in a single process.

For this application, the desired film properties for a single buffer layer structure of silicon titanium oxynitride are different from the $SiO_2$/silicon titanium oxynitride buffer layer structure described above with regard to FIG. 4 that was used only for thermal stabilization of an optical waveguide device. For both thermal and temporal stabilization, a silicon titanium oxynitride film should have a low N/O ratio at the interface between a buffer layer and lithium niobate substrate 10 to somewhat mimic the performance of a $SiO_2$ buffer layer, but yet have controlled degrees of resistivity throughout the layer. This can be achieved by appropriate control of the $N_2/O_2$ ratio in the atmosphere of the sputtering deposition process when the silicon titanium oxynitride buffer layer is deposited on the lithium niobate substrate. Increasing the $N_2/O_2$ ratio during deposition causes a gradient in the N/O ratio within the layer, and thus forms a graded silicon titanium oxynitride buffer layer. A lower $N_2/O_2$ ratio during the initial part of the deposition creates a lower N/O ratio within the graded silicon titanium oxynitride buffer layer adjacent to the interface between the buffer layer and lithium niobate substrate. The lower N/O ratio in the lower part of the buffer layer will serve to maintain optical confinement and improve temporal stabilization. A higher $N_2/O_2$ ratio during the latter part of the deposition creates a higher N/O ratio within the graded silicon titanium oxynitride buffer layer at the top surface of the buffer layer. The high N/O ratio in the upper part of the buffer layer improves thermal stabilization.

Figure 6:
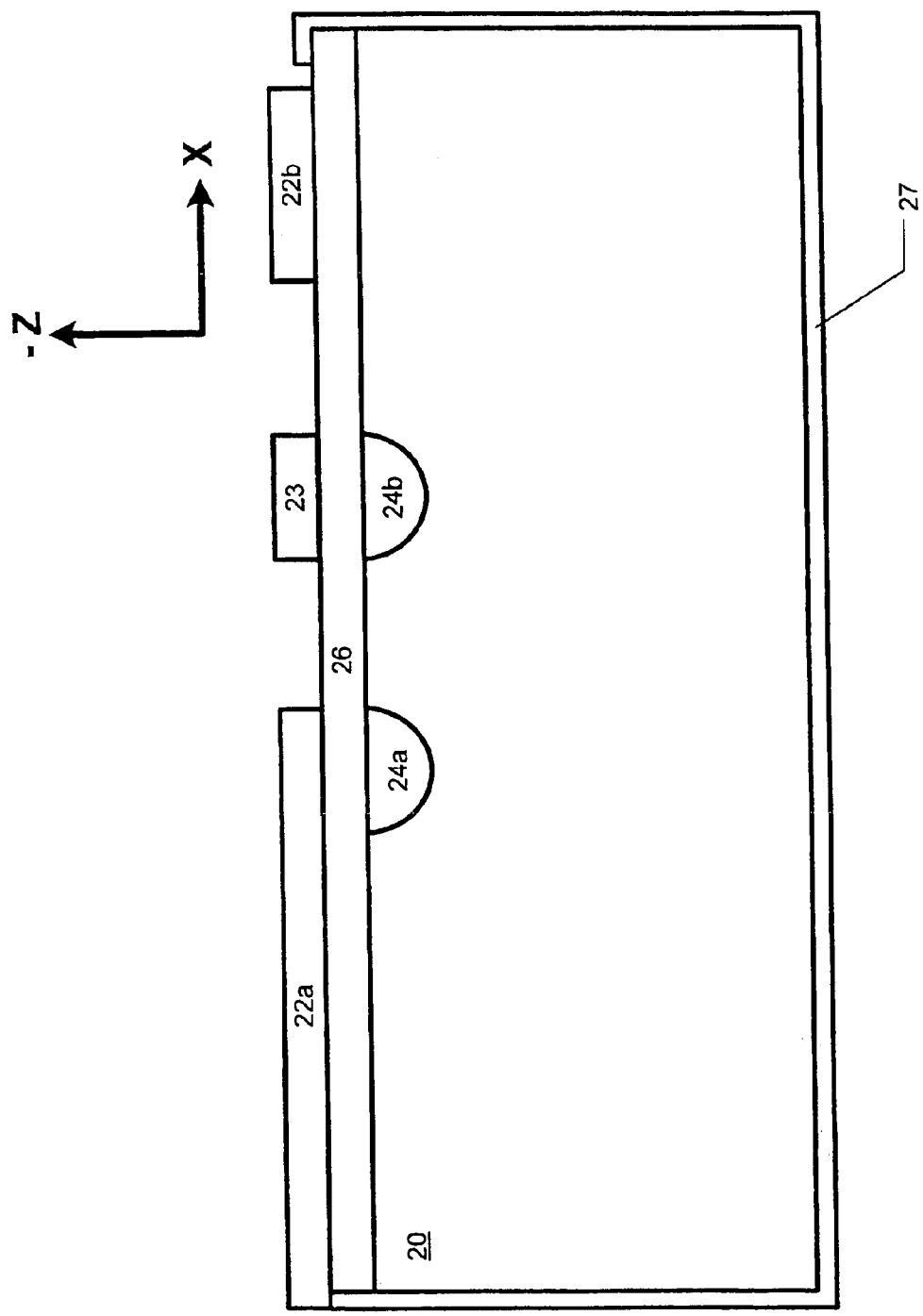
FIG. 6 is a cross-sectional view of a Z-cut lithium niobate waveguide device according to the second exemplary embodiment of the present invention.

FIG. 6 is a cross-sectional view of a second exemplary embodiment of the present invention having a silicon titanium oxynitride film as a single buffer layer for suppressing both thermal and temporal effects in a broadband traveling wave Mach-Zehnder interferometer. The Mach-Zehnder interferometer includes a Z-cut lithium niobate substrate 20 in which optical waveguide paths 24a and 24b are formed by diffusion of a dopant, for example titanium, to form the optical waveguide paths. Electrodes 22a and 23 are respectively positioned above or directly above the optical waveguide paths. In addition, another electrode 22b is positioned on the substrate so that electrodes 22a and 22b are on each side of the electrode 23, which is an input signal electrode. A graded silicon titanium oxynitride buffer layer 26 having gradients in the Si/Ti ratio and/or the N/O ratio is positioned on (i.e. in contact with) the Z-cut lithium niobate substrate below (i.e. vertically separated from) the electrodes 22a, 22b and 23, and above the optical waveguide paths 24a and 24b in the Z-cut lithium niobate substrate 20. The thickness of the graded silicon titanium oxynitride buffer layer 26 is about 0.1–1.5 micron. Similarly as previously discussed with regard to FIG. 4, a connecting layer 27 on the sides of the lithium niobate substrate 20 interconnects the graded silicon titanium oxynitride buffer layer 26 on the −Z face of the lithium niobate substrate 20 to the +Z face of the lithium niobate substrate 20.

The graded silicon titanium oxynitride buffer layer 26 may be doped with indium, or other rare earth metals, in metal or oxide form to further improve temporal stability. Preferably, the rare earth metals should at least be within the graded silicon titanium oxynitride buffer layer 26 adjacent the interface between the buffer layer and lithium niobate substrate 20. This can be accomplished by exposing another target (i.e., multi-source deposition) within the deposition chamber during the initial deposition of the graded silicon titanium oxynitride buffer layer 26.

By increasing the ratio of $N_2$ to $O_2$ during the sputtering deposition of the graded silicon titanium oxynitride buffer layer, the N/O ratio within the layer maintains optical confinement and improves both thermal and temporal stabilization of the device. However, the invention as described above with regard to FIG. 6 can also be applied as a two layer buffer structure instead of a single layer structure having a gradient. The two layer buffer structure further increases the range of resistivities available for each layer since a different percentage fixed target can be used for the deposition of each layer.

Figure 7:
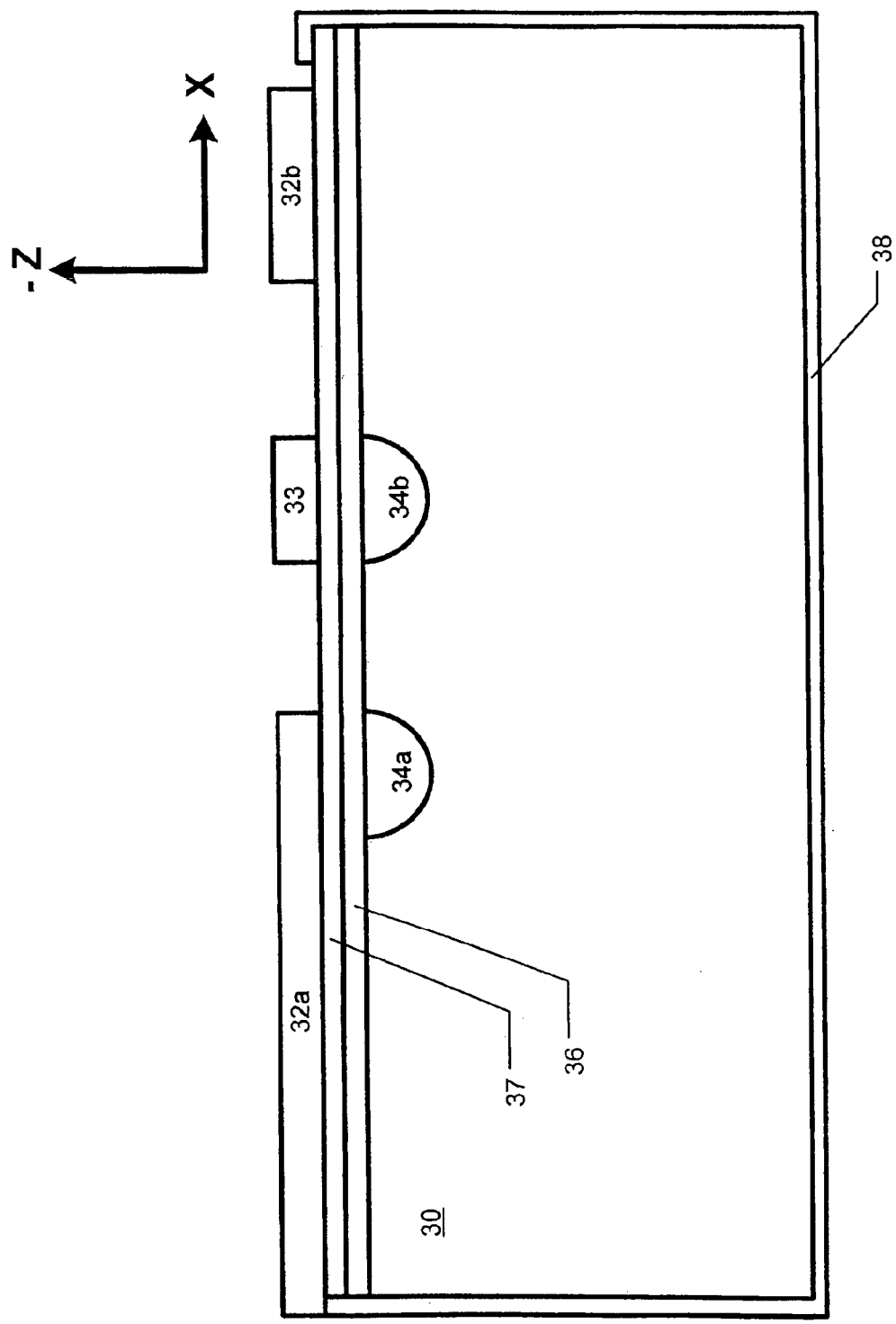
FIG. 7 is a cross-sectional view of a Z-cut lithium niobate waveguide device according to a third exemplary embodiment of the resent invention.

FIG. 7 is a cross-sectional view of the third exemplary embodiment of the present invention of two buffer layers of silicon titanium oxynitride for suppressing both thermal and temporal effects in a broadband traveling wave Mach-Zehnder interferometer. The Mach-Zehnder includes a Z-cut lithium niobate substrate 30 in which optical waveguide paths 34a and 34b are formed by diffusion with a dopant, for example titanium, to form the optical waveguide paths. Electrodes 32a and 33 are respectively positioned above or directly above the optical waveguide paths. In addition, another electrode 32b is positioned on the substrate so that electrodes 32a and 32b are on each side of the electrode 33, which is an input signal electrode. A first silicon titanium oxynitride buffer layer 36 having a first Si/Ti ratio and a first N/O ratio is positioned on the Z-cut lithium niobate substrate 30 below electrodes 32a, 32b and 33, and above the optical waveguide paths 34a and 34b. A second silicon titanium oxynitride buffer layer 37 having a second Si/Ti ratio and a second N/O ratio is positioned on the first silicon titanium oxynitride buffer layer below electrodes 32a, 32b and 33, and above the optical waveguide paths 34a and 34b. The thickness of the first silicon titanium oxynitride buffer layer 36 is about 0.1–1.5 micron and the thickness of the second titanium oxynitride buffer layer 37 is about 0.1–1.5 micron. Similarly as previously discussed with regard to FIG. 4, a connecting layer 38 on the sides of the lithium niobate substrate 30 interconnects the second silicon titanium oxynitride buffer layer to the +Z face (bottom surface) of the lithium niobate substrate 30.

The first Si/Ti ratio in the first silicon titanium oxynitride buffer layer 36 is larger than the second Si/Ti ratio in the second silicon titanium oxynitride buffer layer 37 for temporal stabilization of the Mach-Zehnder device. The second N/O ratio in the second silicon titanium oxynitride buffer layer 37 is larger than the first N/O ratio in the first silicon titanium oxynitride buffer layer 36 for thermal stabilization of the Mach-Zehnder device. Depending on the resistivities required, the first and second silicon titanium oxynitride buffer layers 36 and 37 are formed with different fixed percentage targets at different Si/Ti ratios. Alternatively, the first silicon titanium oxynitride buffer layer can be formed with a gradient change in the ratio of N/O like the graded silicon titanium oxynitride buffer layer discussed with regard to FIG. 6 but with less of a gradient change.

Another alternative is that the first silicon titanium oxynitride buffer layer 36 on the lithium niobate substrate in FIG. 7 may be doped with indium, or other rare earth metals, in metal or oxide form to further improve temporal stability. This can be accomplished by exposing another target (i.e., multi-source deposition including both a $Si_3N_4$–TiN target and a dopant target) within the deposition chamber during the deposition of the first silicon titanium oxynitride buffer layer 36. Another method would be to form the first silicon titanium oxynitride buffer layer 36 with a single $Si_3N_4$–TiN target containing the dopant for improving temporal stability.

Figure 8:
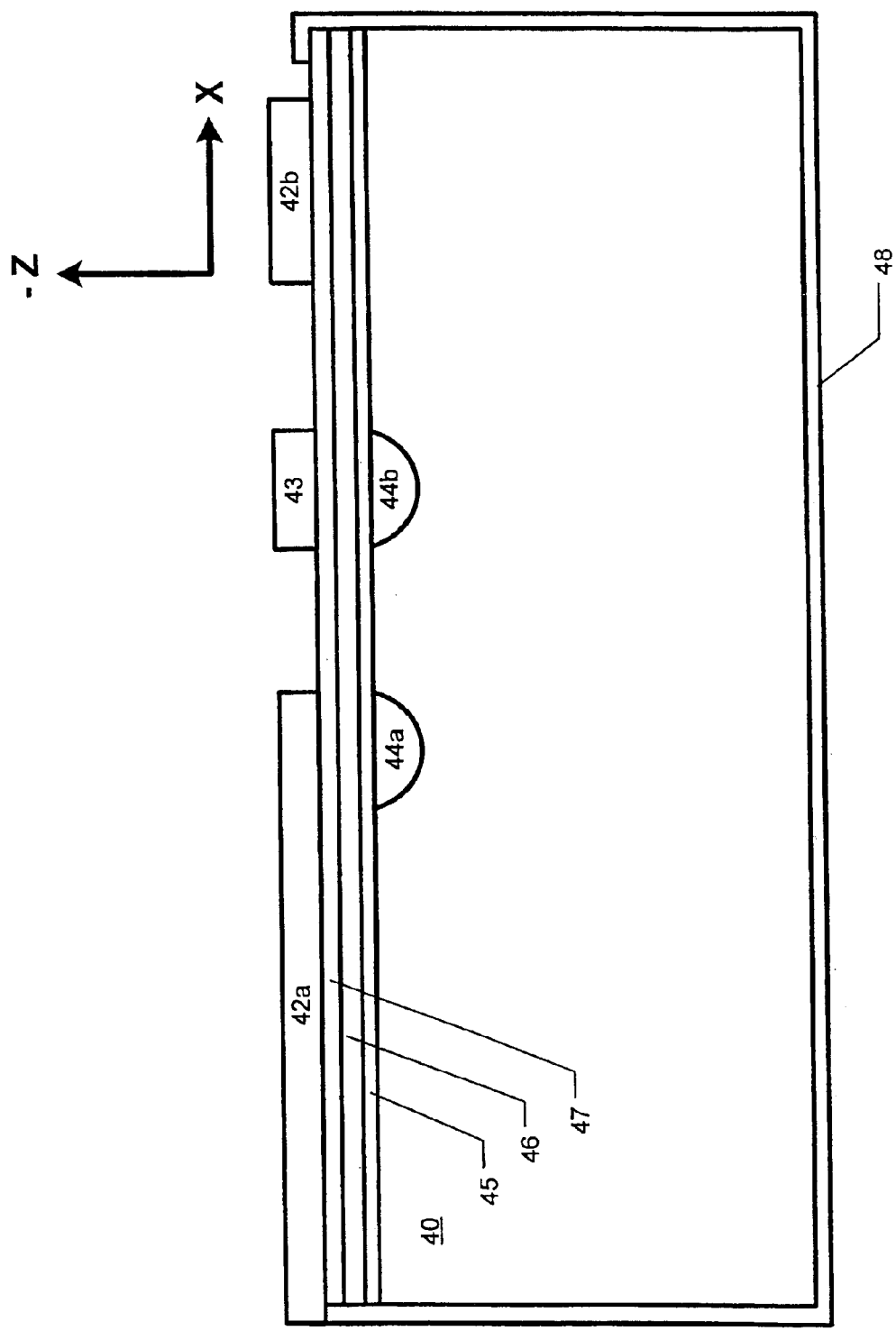
FIG. 8 is a cross-sectional view of a Z-cut lithium niobate waveguide device according to a fourth exemplary embodiment of the present invention.

FIG. 8 is a cross-sectional view of a fourth exemplary embodiment of the present invention having two buffer layers of silicon titanium oxynitride for suppressing both thermal and temporal effects in conjunction with a $SiO_2$ buffer layer that further prevents the optical signal from being absorbed by the electrodes in a Mach-Zehnder interferometer. The Mach-Zehnder interferometer includes a Z-cut lithium niobate substrate 40 in which optical waveguide paths 44a and 44b are diffused with a dopant, for example titanium, to form the optical waveguide paths. Electrodes 42a and 43 are respectively positioned above or directly above the first optical waveguide paths 44a and the second optical waveguide path 44b. In addition, another electrode 42b is positioned on the substrate so that electrodes 42a and 42b are on each side of the electrode 43, which is an input signal electrode. An undoped $SiO_2$ buffer layer 45 is formed on the surface of the Z-cut lithium niobate substrate 40 above the optical waveguide paths 44a and 44b. A first silicon titanium oxynitride buffer layer 46 having a first Si/Ti ratio and a first N/O ratio is positioned on undoped $SiO_2$ buffer layer 45 below electrodes 42a, 42b and 43, and above the optical waveguide paths 44a and 44b. A second silicon titanium oxynitride buffer layer 47 having a second Si/Ti ratio and a second N/O ratio is positioned on the first silicon titanium oxynitride buffer layer 46 below electrodes 42a, 42b and 43, and above the optical waveguide paths 44a and 44b. The thickness of the undoped $SiO_2$ buffer layer 45 is about 0.1–1.5 micron. The thickness of the first silicon titanium oxynitride buffer layer 46 is about 0.1–1.0 micron and the thickness of the second titanium oxynitride buffer layer 47 is about 0.1–1.0 micron. Similarly as previously discussed with regard to FIG. 4, a connecting layer 48 on the sides of the lithium niobate substrate 40 interconnects the second silicon titanium oxynitride buffer layer 47 to the +Z face (bottom surface) of the lithium niobate substrate 40.

The first Si/Ti ratio in the first silicon titanium oxynitride buffer layer 46 is larger than the second Si/Ti ratio in the second silicon titanium oxynitride buffer layer 47 for temporal stabilization of the Mach-Zehnder device. The second N/O ratio in the second silicon titanium oxynitride buffer layer 47 is larger than the first N/O ratio in the first silicon titanium oxynitride buffer layer 46 for thermal stabilization of the Mach-Zehnder device. Depending on the resistivities required, the first and second silicon titanium oxynitride buffer layers 46 and 47 are formed with different fixed percentage targets at different Si/Ti ratios. Alternatively, the first silicon titanium oxynitride buffer layer can be formed with a gradient change in the ratio of N/O like the graded silicon titanium oxynitride buffer layer discussed with regard to FIG. 6 but with less of a gradient change. As described with regard to FIGS. 6 and 7 above, the first silicon titanium oxynitride buffer layer 46 on the undoped $SiO_2$ buffer layer 45 may be doped with indium or other rare earth metals, in metal or oxide form to further improve temporal stability.

Figure 1:
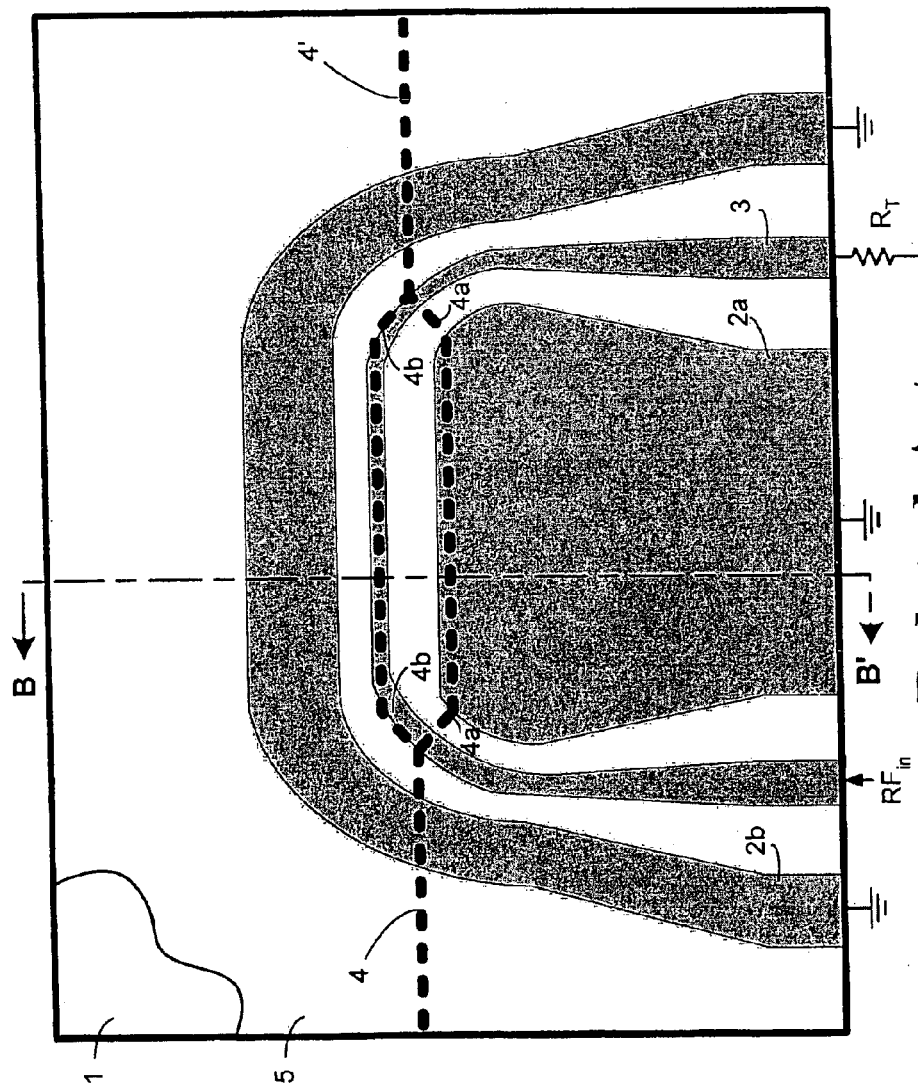
FIG. 1 is a plan view of a related art Z-cut lithium niobate Mach-Zehnder interferometer.
Figure 2:
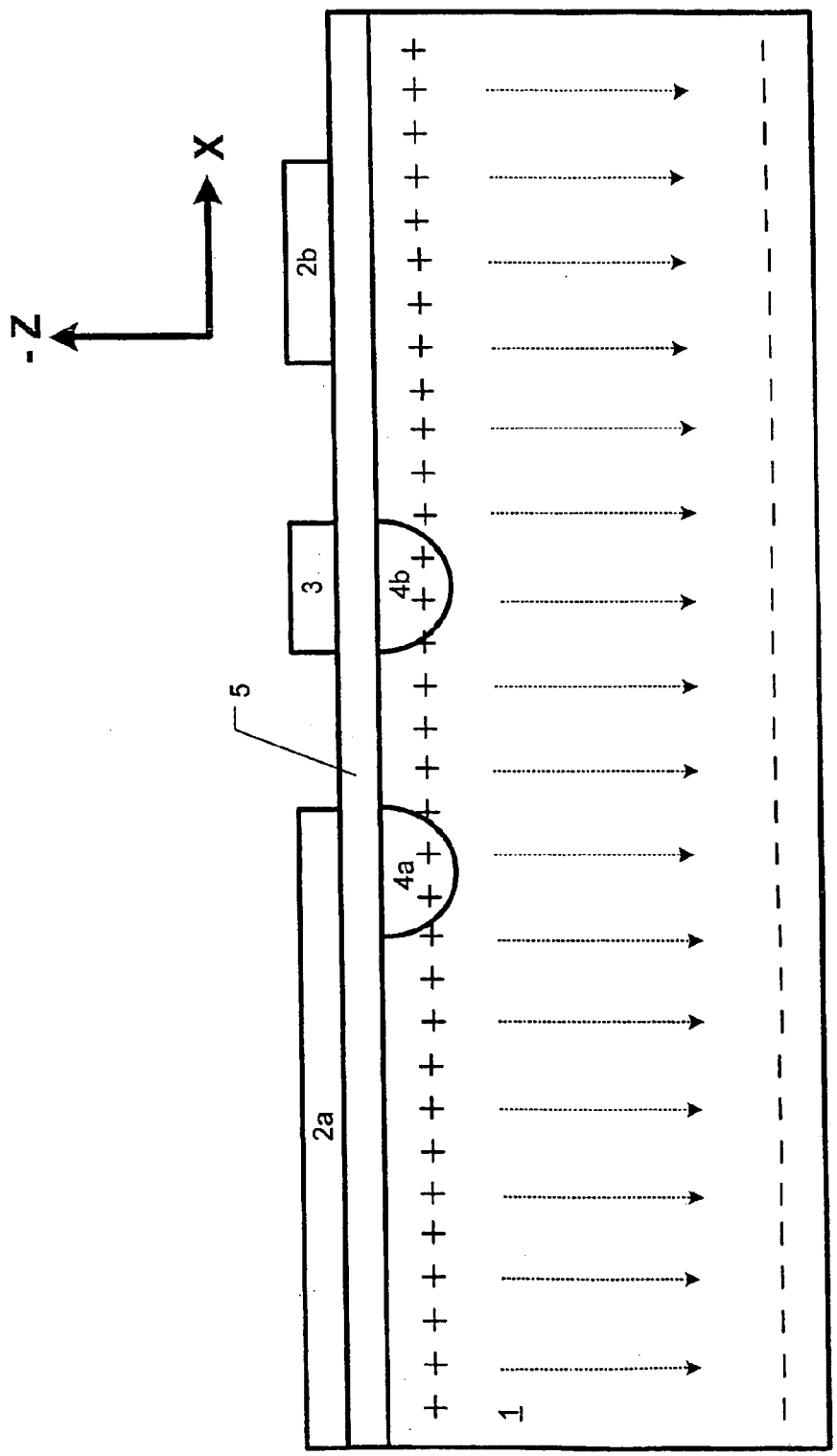
FIG. 2 is cross-sectional view of the related art Z-cut lithium niobate Mach-Zehnder interferometer along line B-B' in FIG. 1.

Although the silicon titanium oxynitride films described above are in Z-cut optical devices, the films may also be used on any orientation of $LiNbO_3$. For example, a high Si/Ti ratio and low N/O ratio silicon titanium oxynitride may be used on the top surface of X-cut $LiNbO_3$ devices for temporal stabilization. Also the device illustrated in FIG. 2 may be formed such that a X axis of the crystal orientation extends in longitudinal direction of the lithium niobate substrate 1 along the waveguide paths 4a and 4b, with the Y axis replacing the X axis shown in the figure. In addition, the buffer structures described above can be used in other optical devices formed within $LiNbO_3$, $LiTaO_3$ or the like electro-optical materials, such as polarizers or optical switches, for thermal and/or temporal stabilization. Furthermore, other elements in column 4 (IVB) of the periodic table can be substituted for titanium in the disclosure above like, for example, Zirconium (Zr). For example, the first buffer layer in the device of FIG. 8 may be silicon zirconium oxynitride while the second buffer layer is silicon titanium nitride.

It will be apparent to those skilled in the art that various modifications and variations can be made in the optical waveguide device of the present invention without departing from the spirit or scope of the invention. Thus, it is intended that the present invention cover the modifications and variations of this invention provided they come within the scope of the appended claims and their equivalents.

What is claimed is:

1. A method for forming an optical waveguide device comprising the steps of:

forming an optical waveguide path within a surface of the electro-optical crystal substrate;

forming a buffer layer comprising silicon, an element in column 4 (IVB) of the periodic table, oxygen, and nitrogen, positioned above the optical waveguide path;

forming at least one electrode positioned above the buffer layer for applying an electric field to the optical waveguide path;

forming a connecting means for interconnecting the thermal stabilization buffer layer to another surface of the electro-optical crystal substrate that is opposite to the surface in which the optical waveguide path is formed.

2. The method for forming an optical waveguide device of claim 1, wherein the buffer layer is sputter deposited using a target comprised of silicon nitride and a nitride of an element in column 4 (IVB) of the periodic table.

3. The method for forming an optical waveguide device of claim 2, wherein the buffer layer is sputter deposited in atmosphere containing $O_2$ and $N_2$.

4. The method for forming an optical waveguide device of claim 2, wherein the target further comprises a rare earth metal.

5. The method for forming an optical waveguide device of claim 2, wherein an additional target containing a rare earth metal is exposed while the buffer layer is sputter deposited.

* * * * *